M. BOUCHET.
TRANSPORTABLE APPARATUS FOR ACTUATING TOOLS OR MACHINES.
APPLICATION FILED JUNE 5, 1914.

1,175,591.

Patented Mar. 14, 1916.
2 SHEETS—SHEET 1.

WITNESSES
William C. Baker, Jr.
J. D. Rollhaus

INVENTOR
MAURICE BOUCHET
BY Munn Co
ATTORNEYS

M. BOUCHET.
TRANSPORTABLE APPARATUS FOR ACTUATING TOOLS OR MACHINES.
APPLICATION FILED JUNE 5, 1914.

1,175,591.  Patented Mar. 14, 1916.
2 SHEETS—SHEET 2.

WITNESSES

INVENTOR
MAURICE BOUCHET
BY
ATTORNEYS

UNITED STATES PATENT OFFICE.

MAURICE BOUCHET, OF PARIS, FRANCE.

TRANSPORTABLE APPARATUS FOR ACTUATING TOOLS OR MACHINES.

1,175,591.  Specification of Letters Patent.  Patented Mar. 14, 1916.

Application filed June 5, 1914. Serial No. 843,318.

*To all whom it may concern:*

Be it known that I, MAURICE BOUCHET, of 22 Rue Alphonse de Neuville, in the city of Paris, Republic of France, have invented a Transportable Apparatus for Actuating Tools or Machines, of which the following is a full, clear, and exact description.

This invention relates to a transportable apparatus capable of constituting various machines such as saws of any kind, boring and grinding machines, etc., or of serving for actuating various machines such as pumps, agricultural implements, etc.

This apparatus is arranged in such a manner as to be able to be used for multiple purposes and to operate in any position. so as to avoid moving the work or the machine to be actuated.

The tool or the machine to be actuated can be mounted on the apparatus itself, for instance on the adjustable arm; or said tool or machine already occupies a predetermined fixed position, the transportable apparatus is brought near the same and, by suitably adjusting the position of the various members, the operating axis of the machine is brought to the required position for operating the tool or the machine.

Figure 1:
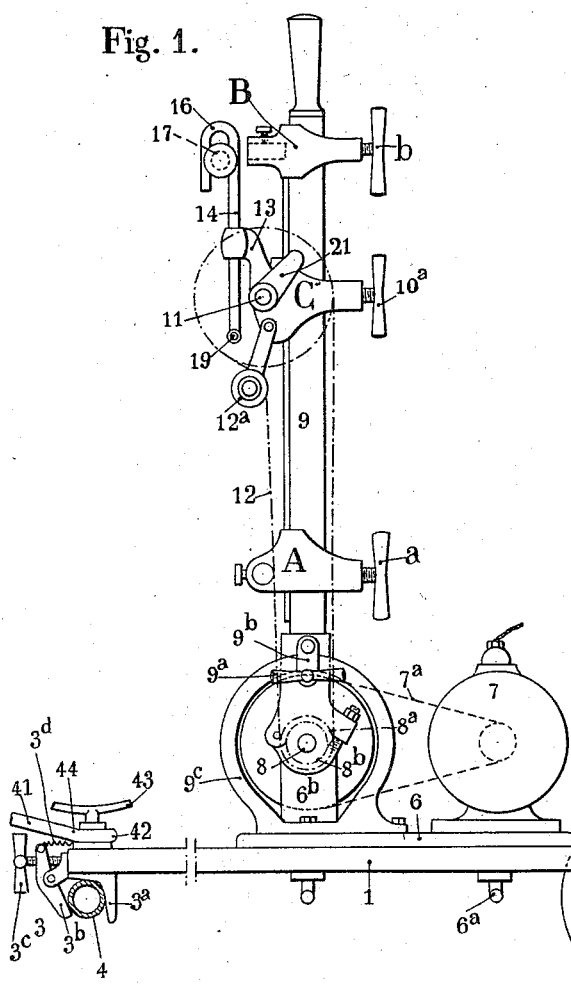
Figure 2:
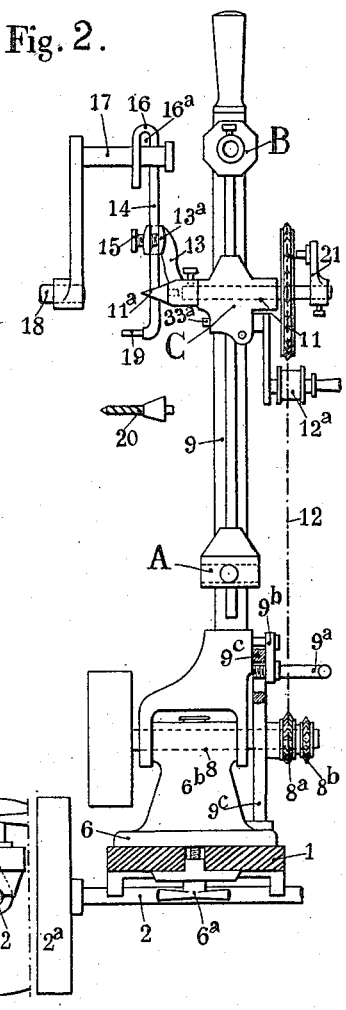
Figure 3:
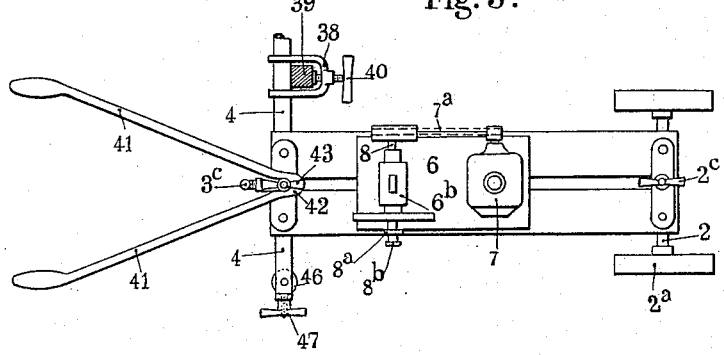
Figure 4:
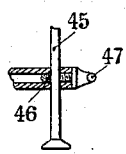
Figure 5:
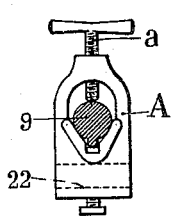
Figure 12:
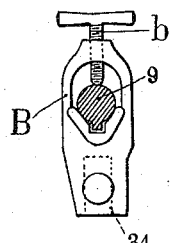
Figure 13:
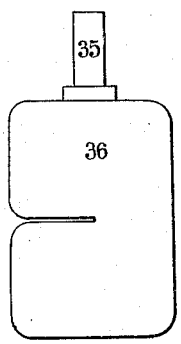
Figure 14:
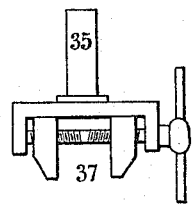

In the accompanying drawing: Figure 1 is an elevation of the new apparatus; Fig. 2 is a corresponding side view; Fig. 3 is a plan view drawn on a smaller scale; Fig. 4 is a detail view of a support used in connection with the apparatus; Fig. 5 is a detail view of one of the carriers forming a part of the apparatus; Figs. 6 to 11, inclusive, are detail views of tools and devices adapted to be used in connection with the carrier shown in Fig. 5; Fig. 12 is a detail view of a carrier similar to the carrier shown in Fig. 5, and also forming a part of the apparatus; and Figs. 13 and 14 are respectively detail views of a device and a tool adapted to be carried by the carrier shown in Fig. 12.

As illustrated in the drawing, the transportable driving apparatus comprises a framework 1 resting at one of its ends on an axle 2 carrying wheels $2^a$. Said axle can slide longitudinally in its bearings, in order to facilitate the adjustment of the position of the framework, or to allow said framework to move during the operation of the apparatus according to circumstances. The said axle passes through the eye of a bolt $2^b$ which can be tightened up by means of a handled nut $2^c$ for locking the framework on the axle.

At its other end the framework is provided with clamp 3 constituted by a fixed shoulder $3^a$ and a jaw $3^b$ which can be closed by means of a screw $3^c$. The said clamp fits upon a tube 4. A spring $3^d$ opens the clamp automatically as soon as the screw is loosened.

The tube 4 may be integral with a frame carrying the work or with the framework of the machine to be actuated; it may also be secured to the ground.

On the framework 1 can slide longitudinally a frame 6 carrying the motor 7, for instance an electric motor. The said frame 6 can be held stationary on the framework 1 by means of eye bolts $6^a$. The frame 6 is provided with a carrier $6^b$ on which rotates an intermediate shaft 8 actuated by the motor 7, for instance by means of a belt $7^a$. Concentrically with the shaft 8 turns an adjustable arm 9 which can be held in the required inclination by means of a handled nut $9^a$; said nut clamps a small plate $9^b$ (Fig. 2) pressing against the fixed sector $9^c$ integral with the frame 6. On the arm 9 is mounted a movable head C held against turning but capable of sliding longitudinally along the arm 9 and of being held in the required position by means of a handled screw $10^a$.

The movable head carries a shaft 11 receiving its motion from the shaft 8. for instance by means of a chain 12. This shaft is thus actuated whatever may be the setting of the shaft. The chain is provided with a swivel or turn-buckle $12^a$ so that the tension and the position of the movable head can be adjusted without altering the length of this chain.

The shaft 8 carries two or more pinions $8^a$ $8^b$, of different diameter, and arranged in juxtaposition so as to allow of modifying the speed at will by transferring the chain from the one to the other.

On the shaft 11 is rigidly mounted a crank 13 of special shape. This crank is provided with a kind of slitted socket $13^a$ in which is clamped a rod 14. The rod 14 can be moved in the socket $13^a$ for adjusting its position. The adjustment being effected, a screw 15 is tightened up. The end of the rod 14 forms a kind of cross head 16 which is fitted obliquely on the crank 17 of the machine to be actuated. A certain amount of play is left at 16ᵃ between the crank 17 and the bottom of the cross head. By means of the oblique position of the cross head, the same rod 14 can serve for driving cranks of different sizes, while avoiding any irregular movement of the parts. Moreover, the play left at 16ᵃ has the advantage of allowing the working, even if the axis of the shaft 11 does not exactly coincide with the axis 18 of the crank 17.

The movable head C is provided with a point 11ᵃ intended to allow of placing the shafts 11 and 18 more easily in alinement with each other. The other end of the rod 14 is provided with a crank pin 19 by means of which it is possible to actuate various lever machines, such as pumps for instance.

Instead of the point 19, a drill 20 can be used for boring or milling. The member 13 of the shaft 11 can also be removed and replaced by a crank 21 adapted to actuate various machines.

On the arm 9 are mounted two carriers A and B which can be moved, without turning, along the arm, in the same way as the movable head C, and be locked by means of screws a and b. These carriers are, generally speaking, adapted to afford, during the working, a bearing or fulcrum either for the tool, or the work or the entire apparatus.

The carrier A is illustrated separately in Fig. 5 with its clamping screw a. The said carrier is provided with a recess 22 in which can be fitted and clamped a rod 23 carrying different members or tools according to circumstances. The said recess 22, when the member A is in position, is arranged parallel to the driving axis 11 of the movable head. This rod 23 can support a grinding wheel 24, Fig. 6, which rotates on the same; a pulley 25 is integral with the grinding wheel and can be controlled by a belt driven by a pulley rigidly mounted on the axis 11 of the movable head or by the pulley of the motor. The said rod serves also as a support for a table 26.

Figure 7:
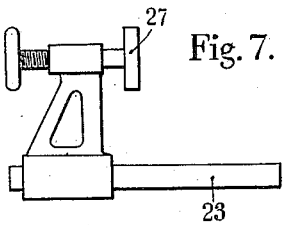
Figure 8:
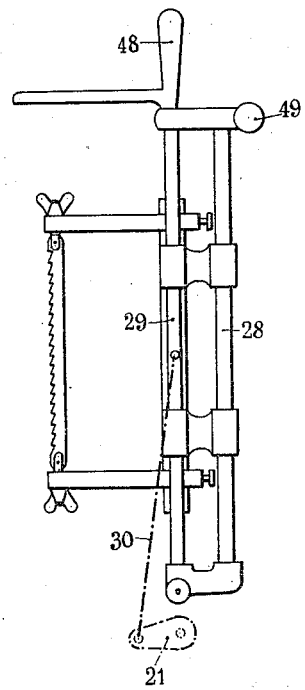

The rod 23 may be connected with an adjustable abutment 27, Fig. 7, adapted to serve as a support or bearing for a member to be drilled or bored. This rod 23 may be connected with a guide frame 28, Figs. 8 and 9, upon which can slide a saw-carrier 29. The said saw-carrier is actuated by a connecting rod 30 pivoted on the crank 21, Fig. 1, when the latter has been placed in position on the shaft 11 instead of the crank 13. Finally the rod 23 may carry a rocking pump frame 31, Fig. 10. In this case, the rod 23 is integral with a bar 32 (Fig. 10) having an eye 33 (Fig. 11) into which must pass a fixed stud 33ᵃ (Fig. 2). This arrangement allows of readily placing the movable head C and the carrier A the one relatively to the other along the arm 9.

The carrier B, Fig. 12, is similar to the preceding one. It can slide along the arm 9 and be locked on this arm by means of a screw h. It presents a recess 34, perpendicular to the axis 11 of the movable head, into which can be fitted and clamped a rod 35. This rod 35 may carry various supporting members, tools or counter-parts, etc. For instance, it may carry a board 36, Fig. 13, adapted to serve as a sawing table; it may also carry a vise, Fig. 14, for securing a member to be sawed.

As will be understood from the foregoing, the position of the three elements A, B, C movable along the arm 9 will be determined according to each use to which the apparatus making the subject-matter of the present invention is to be put.

The tube 4, Figs. 1 and 3, can be secured to the machine to be driven: root-breaker, chaff-cutter, beater, kneader, etc., by means of a yoke 38, Fig. 3, each of the branches of which presents an opening into which can be fitted the tube 4. The yoke is locked on the foot 39 forming part of the machine to be driven by a handled screw 40.

For easily transporting the framework, use is made of handles 41 (Fig. 3) formed by a bent metal rod. The fold 42 of this rod is engaged in a nut 43. A stud 44 (Fig. 2) prevents the rotation of the handles. This arrangement allows of instantaneously putting the handles into position or removing the same.

By means of the new improvements, the putting into place of the apparatus is extremely easy and rapid. The framework is brought forward by causing it to roll on the wheels 2ᵃ until the clamp is located above the tube 4. The framework is lowered for engaging the said clamp on the tube. A transverse adjustment can then be effected by causing the framework to slide on the tube and on its axle, after having loosened the nut 2ᶜ. During this operation, the axle 2, well sustained on its wheels, does not move. It suffices afterward to tighten up the nut 2ᶜ and the screw 3ᶜ for fixing the apparatus in the required position.

In case the weight of the driving apparatus might disturb the equilibrium, the tube 4 is supported at its end by a support or prop, constituted for instance by a stem 45 fitted in a hole provided at the end of the tube. The tube is clamped on the prop at the required height by means of an eye bolt 46 and a nut 47 (Figs. 3 and 4).

The framework being fixed it is possible, by causing the frame 6 to slide and by inclining the arm 9, to bring the axis 11 exactly in alinement with the axis 18 of the apparatus to be driven. It is then simply necessary to put the member 14 into place on the crank, as indicated above.

In case the object in view is not to drive a machine but to constitute one of the machines above set forth, the position of the carriers A and B and of the movable head C is adjusted according to the applications.

Figure 6:
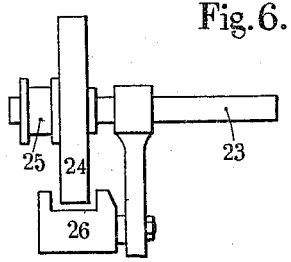
Figure 9:
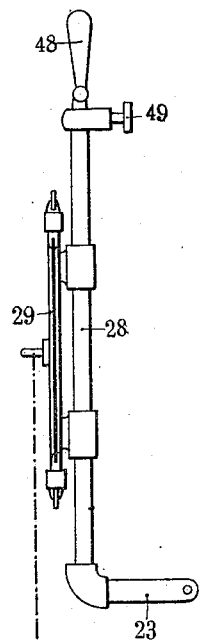
Figures 10, 11:
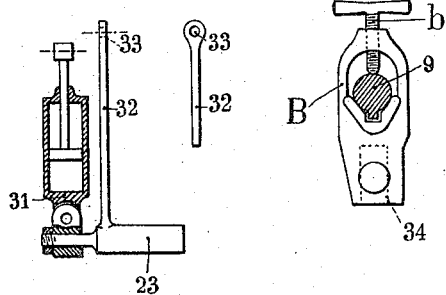

The method of making use of the members illustrated in Figs. 6 and 7 will be readily understood. For the application of the apparatus as a saw, the carrier A is placed above the movable head C. The latter is brought to its lowest position by shortening the chain. The rod 23, Fig. 9, is engaged in the recess 22.

The saw can be used by holding it by means of the handle 48, for sawing for instance a log of wood clamped on a trestle provided with a tube 4 on which the apparatus is fitted.

Instead of a trestle use may be made of the carrier B and of the vise 37 which latter can hold the member to be sawed, even laid on the ground, by reason of the inclination of the arm.

The guide chain of the saw-carrier can be fixed along the arm 9 by means of a hook 49 provided with a screw. The arm 9 being vertically secured and the carrier B together with the table 36 being placed at the suitable height at the middle of the stroke of the saw, a ripping or fret saw is thus constituted.

Instead of being actuated by a motor mounted on the frame, the apparatus can be actuated by a flexible shaft or a Cardan shaft, etc.

Claims:

1. A transportable driving apparatus, comprising a framework, a support at one end of the framework, means for securing the framework at the required inclination to said support, means for securing the support to the machine to be driven, a frame sliding on said framework, means for securing the frame in position on said framework, a motor, a shaft driven by the motor, an adjustable member on the frame, and a driving shaft carried by said member and actuated by the shaft driven by the motor.

2. A transportable driving apparatus, comprising a framework, an axle at one end of the framework, clamping means at the other end of the framework for clamping a fixed member, a frame slidable on the framework, means for securing said frame in position on the framework, a motor carried by the frame, an intermediate shaft driven from the motor, an adjustable arm carried by said frame, and a driving means carried by said arm and actuated from the intermediate shaft.

3. A transportable driving apparatus, comprising a framework, an axle at one end of the framework, means at the other end of the framework for clamping a fixed member, a frame slidable on the framework, an adjustable member on said frame, a motor carried by the frame, a shaft driven by the motor and rotating at a reduced speed, means for securing the fixed member on the apparatus to be driven, and actuating means for the apparatus to be driven, the said actuating means being carried by said adjustable member and driven from the said shaft.

4. A transportable driving apparatus, comprising a framework, a frame movable on said framework, a motor, an intermediate shaft actuated by the motor, an arm turning concentrically to the intermediate shaft, means for securing the arm at the required inclination, and a shaft carried by said arm and driven from the intermediate shaft.

5. A transportable driving apparatus, comprising a framework, means for securing the framework at the required inclination, a frame sliding on the framework, a motor, an intermediate shaft actuated by the motor, an arm turning concentrically to the intermediate shaft, means for securing the arm at the required inclination, and a shaft carried by the said arm and driven from the said intermediate shaft.

6. A transportable driving apparatus comprising a framework, an axle at one end of the framework provided with wheels, a clamp at the other end of the framework for clamping the same to a support, a frame sliding on the framework, means for securing the frame on the framework, a motor on the frame, an intermediate shaft driven from the motor at a reduced speed, an adjustable arm turning concentrically to said shaft, means for securing the arm in adjusted position, and a member carried by said arm and provided with a shaft driven from the said intermediate shaft.

7. A transportable driving apparatus, comprising a framework, a frame movable on said framework, a motor, an intermediate shaft actuated by the motor, an arm turning concentrically to the intermediate shaft, means for securing the arm at the required inclination, a movable member adjustable along the arm, means for securing the said member in position, and driving means carried by said member and actuated from the intermediate shaft.

8. A transportable driving apparatus comprising a framework, a frame movable on said framework, a motor, an intermediate shaft actuated by the motor, an arm turning concentrically to the intermediate shaft, means for securing the arm at the required inclination, a movable head moving along the arm, means for securing said movable head, and an axis carried by the movable head and driven by the intermediate shaft.

9. A transportable driving apparatus comprising a framework, a frame movable on said framework, a motor, an intermediate shaft actuated by the motor, an arm turning concentrically to the intermediate shaft, means for securing the arm at the required inclination, a movable head moving along the arm, means for securing said movable head, an axis carried by the movable head and driven by the intermediate shaft, and a rotary member rigidly mounted on the axis of the movable head.

10. A transportable driving apparatus comprising a framework, a frame movable on said framework, a motor, an intermediate shaft actuated by the motor, an arm turning concentrically to the intermediate shaft, means for securing the arm at the required inclination, a movable head moving along the arm, means for securing said movable head, an axis carried by the movable head and driven by the intermediate shaft, and a crank rigidly mounted on the axis of the movable head.

11. A transportable driving apparatus comprising a framework, a frame movable on said framework, a motor, an intermediate shaft actuated by the motor, an arm turning concentrically to the intermediate shaft, means for securing the arm at the required inclination, a movable head moving along the arm, means for securing said movable head, an axis carried by the movable head and driven by the intermediate shaft, a crank rigidly mounted on the axis of the movable head, and a hook-shaped rod sliding in the crank.

12. A transportable driving apparatus comprising a framework, a frame movable on said framework, a motor, an intermediate shaft actuated by the motor, an arm turning concentrically to the intermediate shaft, means for securing the arm at the required inclination, a movable head moving along the arm, means for securing said movable head, an axis carried by the movable head and driven by the intermediate shaft, a crank rigidly mounted on the axis of the movable head, and a centering point for use in adjusting the height of the movable head.

13. A transportable driving apparatus comprising a framework, a frame movable on said framework, a motor, an intermediate shaft actuated by the motor, an arm turning concentrically to the intermediate shaft, means for securing the arm at the required inclination, a movable head moving along the arm, means for securing said movable head, and means for preventing the movable head from rotating on the arm.

14. A transportable driving apparatus comprising a framework, a frame movable on said framework, a motor, an intermediate shaft actuated by the motor, an arm turning concentrically to the intermediate shaft, means for securing the arm at the required inclination, carriers capable of sliding along the arm, and means for securing said carriers.

15. A transportable driving apparatus comprising a framework, a frame movable on said framework, a motor, an intermediate shaft actuated by the motor, an arm turning concentrically to the intermediate shaft, means for securing the arm at the required inclination, carriers capable of sliding along the arm, means for securing said carriers, and means for preventing said carriers from rotating on the arm.

16. A transportable driving apparatus comprising a framework, a frame movable on said framework, a motor, an intermediate shaft actuated by the motor, an arm turning concentrically to the intermediate shaft, means for securing the arm at the required inclination, a movable head adjustable along the arm, carriers capable of sliding along the arm, means for securing said carriers, one of the carriers presenting a socket parallel to the axis of the movable head.

17. A transportable driving apparatus comprising a framework, a frame movable on said framework, a motor, an intermediate shaft actuated by the motor, an arm turning concentrically to the intermediate shaft, means for securing the arm at the required inclination, a movable head adjustable along the arm, carriers capable of sliding along the arm, means for securing said carriers, one of the carriers presenting a socket perpendicular to the axis of the movable head.

18. A transportable driving apparatus, comprising a frame carrying the driving apparatus, the said driving apparatus having a terminal driving shaft, a support engaging in a member of the machine to be driven and adapted to be secured to the frame to connect the machine to be actuated with the frame, the said support allowing of regulating the distance between the driving apparatus and the machine to be actuated, the said frame being capable of turning relatively to the support to allow of bringing the terminal driving shaft to any desired height, and means for securing the frame to the support at the desired inclination.

19. A transportable driving apparatus comprising a frame, an adjustable arm on said frame, and carrying a terminal driving shaft, supporting means for connecting the frame with the machine to be driven, the said supporting means permitting of regulating the distance between the machine to be driven and the driving apparatus, means for securing the frame to said supporting means at the required inclination, and means for holding the said adjustable arm at the required inclination to allow of bringing the terminal driving shaft in line with the shaft to be actuated, 20. A transportable driving apparatus comprising a frame, an arm adjustable on said frame, supporting means for connecting the frame with the machine to be driven, the said supporting means permitting of regulating the distance between the machine to be driven and the driving apparatus, means for securing the frame at the received inclination on said supporting means, means for holding the said adjustable arm at the required inclination, and a rotative arm carried by the adjustable arm, and having its center of rotation in line with the shaft to be actuated, the said rotative arm being adjustable in length to allow of actuating cranks of different sizes.

The foregoing specification of my transportable system capable of constituting various machines or of actuating various tools or machines signed by me this 26th day of May, 1914.

MAURICE BOUCHET.

Witnesses:
CHAS. P. PRESSLY,
RENÉ THIRIOT.

Copies of this patent may be obtained for five cents each, by addressing the "Commissioner of Patents, Washington, D. C."